Patented Dec. 5, 1922.

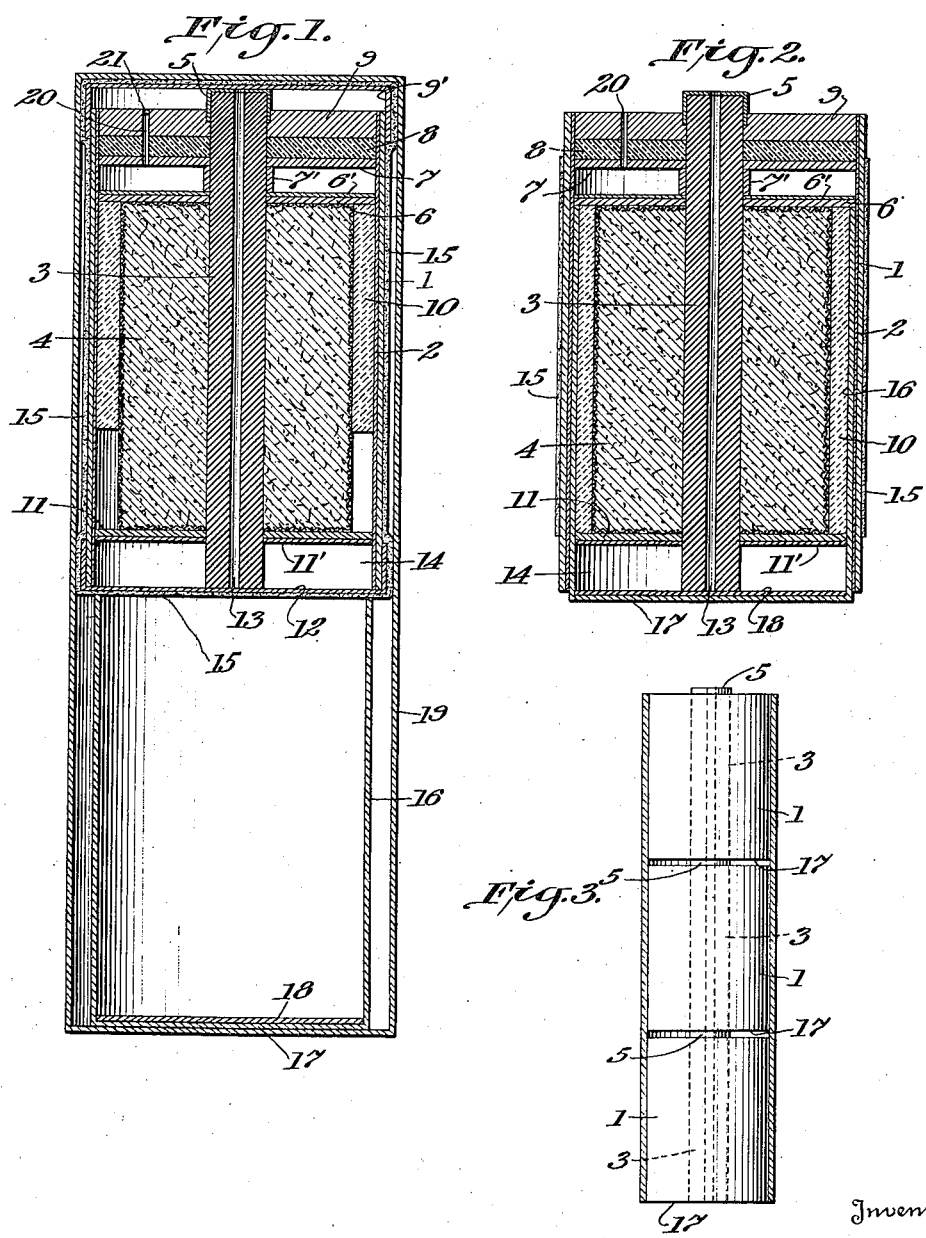

1,438,084

UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

ELECTRIC BATTERY.

Application filed February 12, 1920. Serial No. 358,260.

*To all whom it may concern:*

Be it known that we, RAYMOND C. BENNER and HARRY F. FRENCH, both citizens of the United States, residing at Fremont, in the county of Sandusky and State of Ohio, have invented certain new and useful Improvements in Electric Batteries, of which the following is a specification.

This invention relates to an improvement in dry cells of the type in which deterioration is eliminated, these cells being normally inactive and requiring some manipulation to render them active.

More particularly the invention relates to a cell in which the zinc electrode is not subject to corrosion by reason of the fact that it is kept separated from the other elements until the cell is to be used.

It is especially difficult in making cells of this kind to prevent the ingredients from drying out and to prevent leakage after the cell is put into service.

The principal object of the invention is to provide a cell of the kind referred to in which the difficulties mentioned are reduced or entirely eliminated.

Another object of the invention is to improve upon certain features of the construction shown in our pending application Ser. No. 314,197, filed July 30, 1919.

A further object of the invention is to conveniently provide cells of the deferred action type with a space for receiving paste or electrolyte exuded on heavy service.

Other objects will be referred to in the following description in connection with a cell embodying the improvements.

In the drawings:—

Fig. 1 is a section of the cell in the inactive condition.

Fig. 2 is a section of the cell after it has been activated.

Fig. 3 is a view illustrating a plurality of the cells connected in series for use in a battery flashlight.

The construction comprises a casing which is open at both ends, which by way of example may consist of an outer jacket 1 of waterproof material provided with a thin liner 2 of celluloid or analogous material. Various other materials may be utilized for the casing such as metals which are not corroded by the electrolyte, sheet iron coated with lacquer or other non-corrosive material, hard rubber, etc. It is only necessary that the casing material be waterproof and unaffected by the battery ingredients and for commercial reasons should be inexpensive. We have found that ordinary waterproofed materials such as paraffined cardboard are likely to become softened due to non-uniformity of the coating, scratches, etc., which allow moisture to reach the material, and therefore prefer to use lacquered sheet iron, celluloid and similar durable substances.

Within the casing and spaced therefrom is placed a bobbin comprising a longitudinally perforated carbon electrode 3 and a depolarizing mix 4 of manganese dioxide, carbon and electrolyte solution, molded around the carbon electrode so that the ends of the latter project from the mix. The projecting lower end of the electrode is substantially flush with the lower end of the casing. The upper end projects beyond the upper edge of the casing and is provided with a brass terminal cap 5 having an opening corresponding with the perforation in the electrode. An insulating disk 6 is fitted over the end of the mix and a thin layer of paraffine 6' poured thereon. A second disk 7 in the casing is spaced from disk 6 by means of a spacer 7' of insulating material, to provide a chamber in the upper end of the cell which serves to receive gases and as a precaution against leakage. A closure consisting of a pitch or other relatively soft subseal 8 adjacent disk 7, and an upper seal 9 flush with the end of the casing, are adapted to support the bobbin in the casing and close the end. The soft subseal 8 is for the purpose of securing an exceptionally tight closure, and with an air-tight closure it is desirable to insert a small vent tube 20 through the seals and to temporarily close the vent in a suitable manner, a filling of paraffine 21 in the end being shown by way of example. The terminal end of the electrode is closed by applying a paper cap 9' to the end of the cell.

A thick paste 10 consisting of the usual ingredients, such as flour or starch, electrolyte solution and a preservative such as mercuric chloride, fills the space between the mix and casing to within a short distance of the lower end of the mix. Said paste is retained in position by the disk 6 and a third insulating disk 11 fitted over the lower projecting end of the electrode adjacent the mix. A thin layer of paraffine 11' is poured over the disk after inserting. The layers of paraffine 6' and 11' on the disks 6 and 11 prevent paste or electrolyte from working past the disks into the spaces adjacent thereto. The layer 6' is especially useful during assembly, to prevent the paste or electrolyte from leaking past the disk 6. A suitable closure is provided for the lower end of the casing, a paper cap 12 being illustrated for this purpose. By utilizing a projecting carbon electrode a chamber 14 is provided between the disk 11 and cap 12 for a purpose to be referred to hereafter.

After assembling in the manner described it is usually desirable to dip the entire cell in waterproofing material such as paraffine 15 to retain the caps and to prevent evaporation. With other types of closure, such as may be secured by the use of metal casings and caps or press fit metal bottoms, the caps and paraffine coating may be eliminated, but the casing described is considered preferable because it is simple and provides a dependable seal.

The structure described will be utilized with a hollow anode of zinc, preferably a cylindrical can having an active side surface 16 and a bottom 17 having a paper disk 18 adjacent thereto. A drawn zinc cup having an integral bottom is especially desirable although it is within the purview of our invention to utilize zinc tubes with detachable closures of waterproof material, the latter being either metallic or non-metallic. For convenience the zinc electrode and the article described for use therewith are generally packed together in a suitable receptacle 19, and may be kept for indefinite periods before being placed in service, without any deleterious effects.

When the cell is to be used either the dealer or the customer will remove the component parts from the carton and insert the zinc electrode in the simple manner which will now be described in connection with the modification illustrated. The caps 9' and 12 are removed from the casing by loosening them from the paraffine in any manner. The zinc can which makes a close fit with the casing is then inserted in the lower end and slowly pressed toward the seal. The disk 11 is adapted to yield sufficiently to permit the can to pass into the paste 10 until the bottom of the carbon electrode abuts against the disk 18 in the bottom of the can. This action causes the paste to be displaced to substantially fill the space between the mix and zinc electrode. When the can is pushed into the casing the air which is trapped therein escapes through the hollow carbon electrode which will be closed when the heavy paper disk touches the end of the electrode. In this position, as illustrated in Fig. 2, the active zinc surface extends to the upper disk 6, although it may, if desired, extend into the upper chamber 6'. The paraffine 21 in the vent 20 in the seal will then be opened by inserting a pin or wire therein.

One of the important features of the construction is the chamber 14 provided in the lower end of the cell to receive paste and electrolyte exuded on heavy service. As the paste is exuded this is prevented from running to the bottom of the zinc can by means of the disk 11 which is gradually moved toward the bottom. The arrangement shown is an especially desirable method for securing such a chamber in a cell. By permitting the carbon electrode to extend beyond the mix and disk 11, convenient means are provided for spacing the zinc can from the mix. When the cell is placed in service with the zinc can bottom adjacent the carbon electrode, a number of cells may be placed in series as shown in Fig. 3, due to the fact that a central column is secured for withstanding pressure such as is applied to the ends of a series of cells in an ordinary flashlight. Other means may be utilized instead of the carbon electrode, to secure the lower chamber and vent, but the perforated projecting carbon electrode is particularly desirable because it does not introduce any additional elements. We have found that cells provided with an air chamber below the mix and a carbon electrode in the mix extending only to the lower end of the mix in the usual manner, generally will not withstand the mechanical pressure applied to the ends in a battery hand lamp. This is due to the fact that the ordinary seals do not hold the carbon sufficiently securely to resist pressure unless some means is provided at the lower end of the electrode for transmitting the pressure to the bottom of the cell.

Another feature also associated with the projecting carbon electrode is the method in which it serves as a vent when the can is inserted. By using a longitudinally perforated carbon electrode the air trapped in the can escapes readily while the latter is being inserted, but the perforation is covered when the can is in the active position, thus preventing the leakage of paste if any accumulates below the disk 11. Although the upper chamber is desirable as an extra precaution against leakage, it may be omitted entirely, in which case the gases generated will collect in the lower chamber and escape through the hollow carbon, due to the more or less imperfect contact between the disk 18 and the end of the electrode.

Having described our invention, what we claim is:—

1. A dry cell comprising a container, a depolarizing mix therein, a supply of paste adjacent the mix and a chamber in the lower end of said cell adapted to receive exuded paste.

2. An article of manufacture of the kind described, comprising a depolarizing mix, a container surrounding the mix and having its lower end extending beyond the mix to provide an air chamber in the lower end of the container.

3. An article of manufacture of the kind described, comprising a depolarizing mix, a casing surrounding the mix and having its lower end extending beyond the mix to provide an air chamber in the lower end of the casing, and a filling of paste between the mix and casing.

4. A dry cell comprising a hollow anode, a depolarizing mix therein spaced therefrom, a filling of paste between the anode and depolarizing mix and closures for the upper and lower ends of the hollow anode, there being a chamber between said closure for the lower end and the lower end of the mix.

5. An article of manufacture of the kind described, comprising a container, a depolarizing mix therein, an air chamber at one end of the mix, a filling of paste adjacent the mix and a disk located at said end of the container adjacent the mix adapted to retain said paste.

6. A dry cell comprising a hollow anode, a depolarizing mix therein spaced therefrom, a filling of paste between the anode and depolarizing mix, a disk located at one end of the mix for retaining the paste, and a closure for said end of the anode spaced from the disk to provide a chamber to permit movement of the disk therein.

7. A dry cell comprising a casing, a hollow anode adapted to be inserted in said casing, a depolarizing mix, a carbon electrode in said mix having its lower end projecting therefrom, and a closure for one end of the anode adapted to abut against the projecting end of the carbon electrode to provide an air chamber in the cell.

8. A dry cell comprising a hollow anode, a depolarizing mix therein spaced therefrom, a carbon electrode in the mix having an end projecting therefrom, a filling of paste between the anode and depolarizing mix, a disk located at the same end of the mix as the projecting end of the carbon electrode for retaining the paste, and a closure for the adjacent end of the hollow anode in contact with the projecting end of the carbon electrode adapted to provide a chamber to permit movement of the disk therein.

9. A dry cell of the kind described, comprising a depolarizing mix, a casing surrounding the mix, a zinc container electrode adapted to be inserted in one end of the casing, a filling of paste between the mix and active surface of the zinc, a second electrode in the mix having means associated with one end projecting beyond the mix, for spacing the mix from the bottom of the container electrode to provide an air chamber in the lower end of the cell, and a vent adapted to be closed upon inserting the zinc by contact of the bottom of the zinc electrode with said means associated with one end of the second electrode.

10. In dry cells of the type described, a casing, a zinc container electrode adapted to be inserted in the casing to render the cell active, a depolarizing mix and a longitudinally perforated carbon electrode adapted to serve as a vent when the zinc electrode is inserted.

11. A dry cell comprising a zinc electrode, a closure for the upper end of the container, a depolarizing mix in the container having its lower end spaced from the lower end of the container, a carbon electrode projecting from the lower end of the mix, and a metallic closure for the bottom of the container, said metallic closure being in electrical connection with the zinc electrode and adjacent but insulated from the carbon electrode.

12. A dry cell comprising a non-corrosive waterproof casing, a closure for the upper end of the casing, a depolarizing mix in the casing spaced therefrom, a filling of paste between the mix and casing, a longitudinally perforated carbon electrode in the mix having the upper end projecting through the closure and the lower end projecting from the mix, and a zinc can having a metallic closure for one end adapted to be inserted in the casing, and an insulating disk in the can adjacent the bottom thereof, adapted to cover the perforation at one end of the carbon when the zinc can is fully inserted in the casing.

13. A dry cell comprising a zinc container electrode, a depolarizing mix therein, and a chamber at each end of the mix adapted to receive gases evolved during service.

14. An article of manufacture comprising a casing containing all the necessary ingredients of a dry cell except the zinc electrode, and closures for the ends of the casing, one of said closures being removable to permit a zinc electrode to be subsequently inserted, and having a waterproof coating adapted to provide hermetic sealing to prevent evaporation of moisture.

15. An article of manufacture comprising a casing containing all of the necessary ingredients of a dry cell except the zinc electrode, a removable cap over each end of the casing and a coating of waterproof material over the casing and caps adapted to provide hermetic sealing.

16. A dry cell of the kind described, comprising a casing having a closure at the upper end, a depolarizing mix bobbin therein spaced therefrom, a longitudinally perforated carbon electrode in the mix, said electrode having its upper end projecting from the mix and through the upper closure and its lower end projecting from the mix and substantially flush with the end of the casing, a filling of paste between the casing and mix, a disk at the upper end of the mix and a disk at the lower end of the mix, adapted to retain the paste in position, a zinc can adapted to be inserted in said casing, the air trapped in the can being permitted to escape through the perforated carbon electrode, and a disk in the bottom of the can adapted to abut against the lower end of the carbon electrode to cover the perforation and to provide an air space between said last mentioned disk and the disk at the bottom of the mix.

17. An article of manufacture of the kind described, consisting of a cylindrical member, a depolarizing mix bobbin therein spaced therefrom, a closure in one end of the cylindrical member for supporting the mix bobbin therein, a vent in said end, an air-tight cap over said end, a filling of energizing material in the cylindrical member, and a second air-tight cap on the other end.

18. An article of manufacture of the kind described, consisting of a cylindrical member, a depolarizing mix therein spaced therefrom, a longitudinally perforated carbon electrode in the mix, a closure in one end of the casing for supporting the mix bobbin therein, an air-tight cap over said end, a filling of paste between the bobbin and the cylindrical member, and a second air-tight cap for closing the other end of the cylindrical member.

19. An article of manufacture of the kind described, consisting of a waterproof casing, a depolarizing mix therein spaced therefrom, sealing means in one end of the casing for supporting the mix bobbin therein, a longitudinally perforated carbon electrode surrounded by the mix and projecting from the same, a cap over said end, a layer of waterproof material over said cap and the portion of the casing in proximity thereto, a filling of paste between the bobbin and casing, a second cap for closing the other end of the casing, and a layer of waterproof material over the second cap and the portion of the casing in proximity thereto.

20. An electric battery of the kind described, consisting of a waterproof casing, a depolarizing mix therein spaced therefrom, a carbon electrode in the mix and projecting therefrom, sealing means in one end of the casing for supporting the mix bobbin therein, a vent in said end and a removable cap over said end and the projecting end of the electrode, a filling of paste between the bobbin and casing, a cap for closing the other end of the casing adapted to be removed to permit a zinc can to be inserted in the casing to render the cell active and to prevent the paste and bobbin from drying out prior to said insertion, said caps and casing having a coating of waterproofing material.

In testimony whereof, we affix our signatures.

RAYMOND C. BENNER.
HARRY F. FRENCH.